(12) United States Patent
Veselic et al.

(10) Patent No.: US 7,518,343 B2
(45) Date of Patent: Apr. 14, 2009

(54) METHOD AND APPARATUS FOR HANDLING A CHARGING STATE IN A MOBILE ELECTRONIC DEVICE

(75) Inventors: Dusan Veselic, Oakville (CA); Alexei Skarine, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 409 days.

(21) Appl. No.: 10/852,781

(22) Filed: May 25, 2004

(65) Prior Publication Data

US 2004/0239294 A1    Dec. 2, 2004

(30) Foreign Application Priority Data

May 27, 2003    (GB)    ................................. 0312079.7

(51) Int. Cl.
*H02J 7/00*    (2006.01)
*H02J 7/04*    (2006.01)
*H01R 4/48*    (2006.01)

(52) U.S. Cl. ........................ 320/155; 320/134; 320/114; 320/132; 439/894

(58) Field of Classification Search .................. 320/155
See application file for complete search history.

(56) References Cited

U.S. PATENT DOCUMENTS

| 2003/0052547 A1* | 3/2003 | Fischer et al. ............... 307/154 |
| 2003/0054703 A1* | 3/2003 | Fischer et al. ............... 439/894 |
| 2003/0076138 A1 | 4/2003 | Hwang |

* cited by examiner

*Primary Examiner*—Edward Tso
*Assistant Examiner*—Alexis Boateng
(74) *Attorney, Agent, or Firm*—Conley Rose, P.C.; J. Robert Brown, Jr.

(57) ABSTRACT

The present invention is directed at a method of handling a device charging state for a Universal Serial Bus (USB) connected mobile electronic device comprising the steps of sensing a presence of a bus voltage; sensing an enumeration acknowledgement signal between the device and a USB host; and transmitting a signal to instruct the device to enter the device charging state.

11 Claims, 4 Drawing Sheets

METHOD AND APPARATUS FOR HANDLING A CHARGING STATE IN A MOBILE ELECTRONIC DEVICE

This application claims priority from British Application Serial No. 0312079.7 filed on May 27, 2003, published as GB2402271, the entirety of which is incorporated herein by reference.

FIELD OF THE INVENTION

The present invention relates in general to mobile electronic devices and more specifically to a method and apparatus for setting of a charging state in a mobile electronic device.

BACKGROUND OF THE INVENTION

Portable systems, such as mobile electronic devices, which are powered by rechargeable batteries have a problem supporting both USB (Universal Serial Bus) charging and suspend functions.

In operation, USB specifications require that any devices which are connected to a USB host initiate enumeration within ~150 msec of a USB cable being attached, hereon referred to as "VBUS detection". Enumeration is the process whereby devices attached to the USB host request permission to access the host. In the present invention, the enumeration request is directed to a request to draw power from the USB host in order to power up the mobile electronic device which has a dead or non-present battery.

When the rechargeable battery is dead or not present, the mobile electronic device can not operate since it does not have any power. In most cases, it is desired that a battery charger within the mobile electronic device turn on once it receives power from the USB VBUS power line upon VBUS detection. This causes the charger to be enabled so that power is supplied from the USB host for operation of the device and recharging of the battery. This may be referred to as a device charging state. Therefore, when the voltage via the VBUS is applied, the charger turns on and acts as the battery to power the CPU along with charging the battery. In this case, all the signals to the battery charger are in a low state.

Another common state for the mobile electronic device is a device suspend state. USB specifications require that a total USB supply current to the mobile electronic device not exceed 500 µA in the device suspend state. With many mobile electronic devices, 500 µA is not enough current for the CPU of the mobile electronic device to operate and therefore the device should be powered down. Powering down of the CPU causes all the control signals to default to a low logic level state, which would then keep the charger on. This state of the charger is not desirable for the system, during a device suspend state. In some prior art devices, two separate signals to control the device charging state and the device suspend state are used.

In some other prior art devices, support for the device suspend state is not recognized and the battery charger remains enabled during the device suspend state. In this manner, the 500 µA current limit is not recognized by the mobile electronic device even though it is required under the USB specifications.

Therefore, there is provided a method and apparatus for handling a charging state in a mobile electronic device.

SUMMARY OF THE INVENTION

In a first aspect, the present invention provides a method of handling a device charging state for a Universal Serial Bus (USB) connected mobile electronic device comprising the steps of sensing presence of a bus voltage, sensing an enumeration acknowledgement signal between said device and a USB host, and transmitting a signal to instruct said device to enter said device charging state.

In another aspect of the invention, there is provided a method of entering a device charging state for a mobile electronic device connected to a USB host, comprising the steps of sensing an input voltage from said USB host, transmitting a time dependent enable signal to a battery charger, requesting enumeration from said USB host, receiving enumeration acknowledgement from said USB host, verifying that said time dependent enable signal has not elapsed, and transmitting an enumeration acknowledged enable signal to said battery charger overriding said time-dependent enable signal if said time dependent enable signal has not elapsed.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
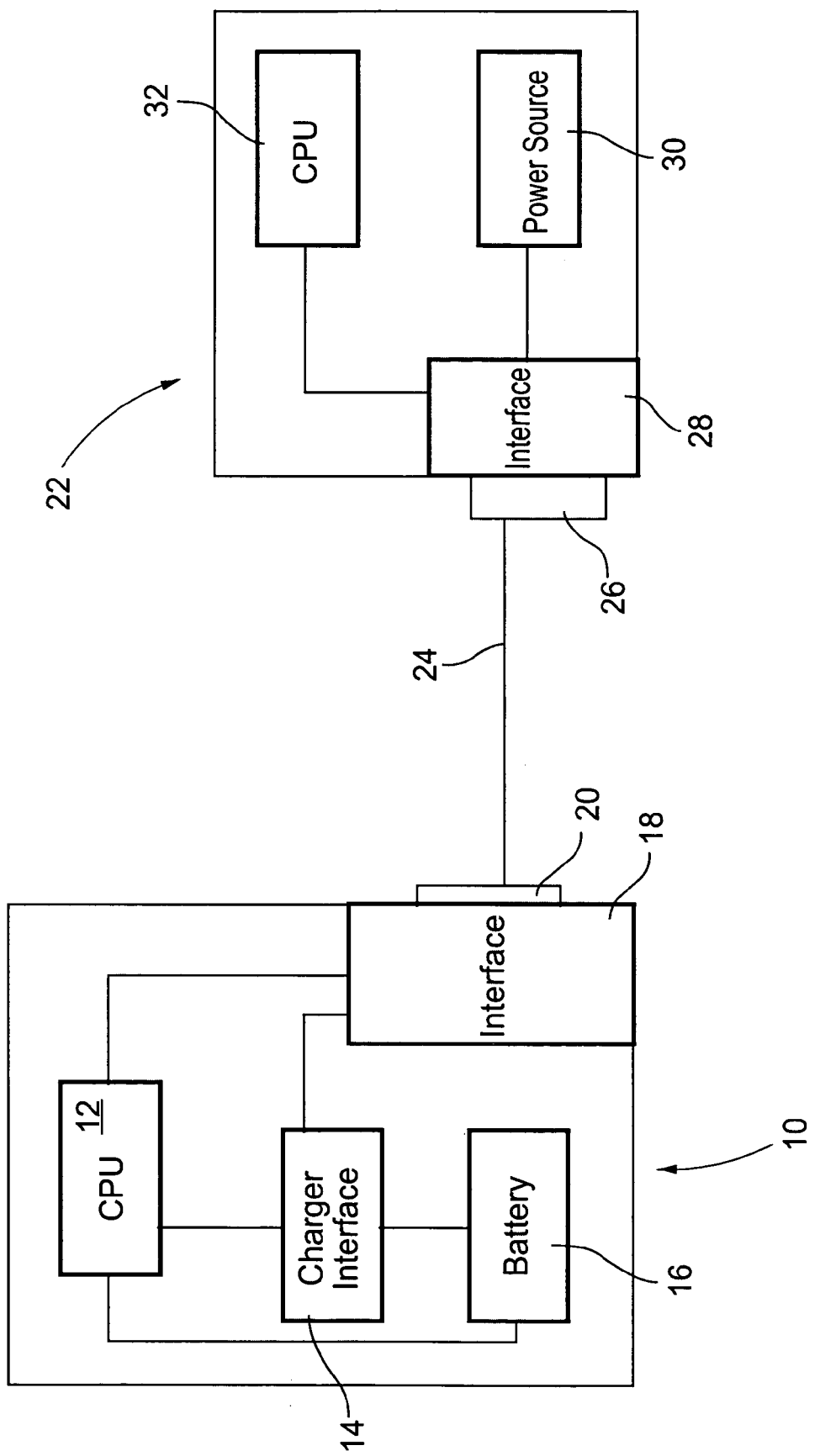
FIG. 1 is a block diagram of a mobile electronic device connected to a Universal Serial Bus (USB) host.

Turning to FIG. 1, a block diagram of a mobile electronic device connected to a Universal Serial Bus (USB) host is shown. The mobile electronic device 10 comprises a central processing unit (CPU) 12 connected to a charger interface 14 which, in turn, is connected to a rechargeable battery 16. The CPU 12 is also connected to the rechargeable battery 16 and to a USB interface 18 which is connected to a USB port 20.

During operation of the mobile electronic device 10, when a user determines that the rechargeable battery 16 is dead or not present, the user connect the mobile electronic device 10 to the USB host 22 via a USB cable 24. Within the USB cable 24 are four separate cables: a power line, a ground line and two data lines. At the USB host 22, the USB cable 24 is connected to a USB host port 26. A device interface 28, preferably a mobile electronic device interface, is connected to the USB host port 26 for transmitting data and current to and receiving data from the mobile electronic device 10. The USB host 22 further comprises a power source 30 and a CPU 32 which are both connected to the device interface 28.

Figure 2:
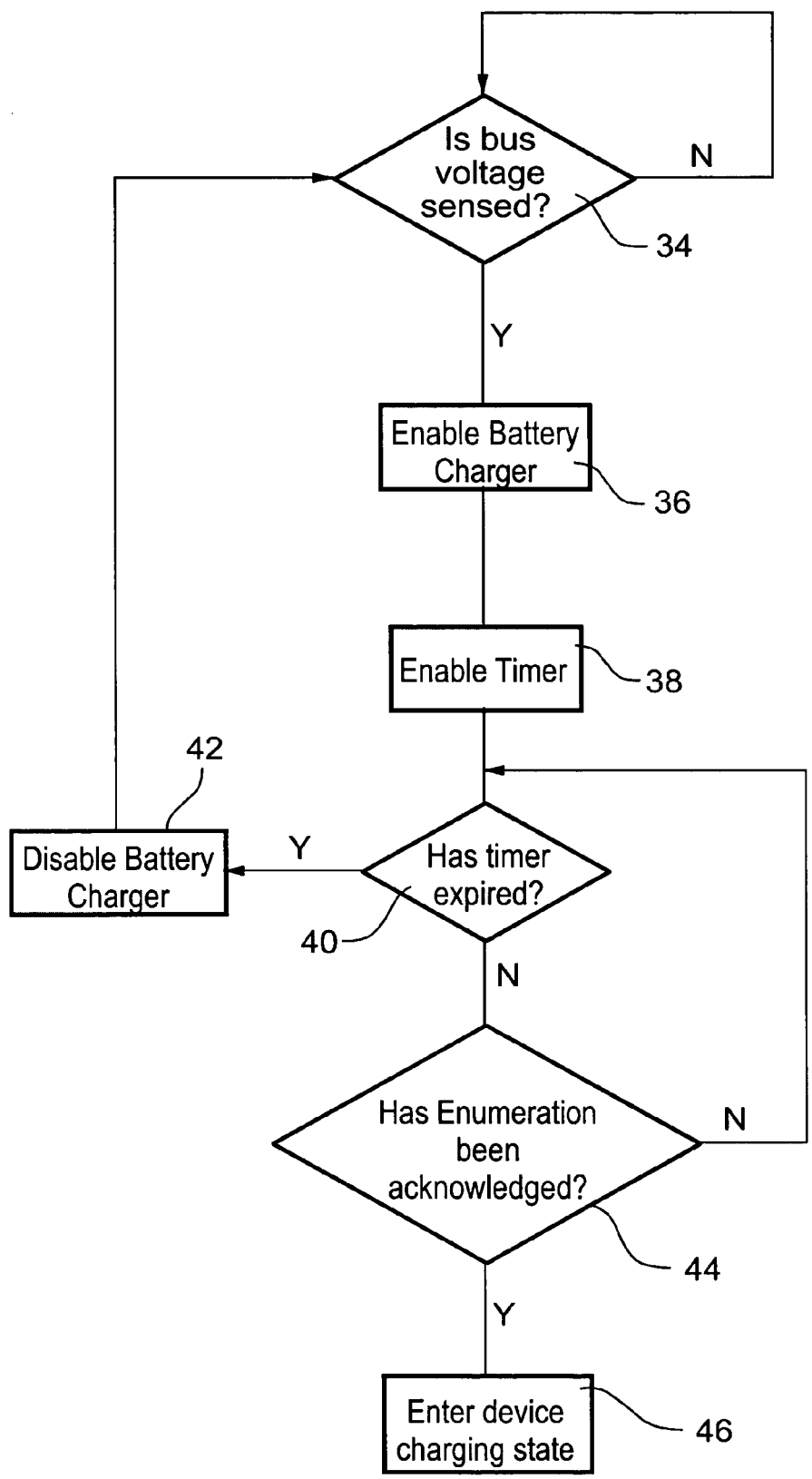
FIG. 2 is a flow diagram outlining a method of handling a device charging state for a mobile electronic device.

Turning to FIG. 2, a method of switching between a device suspend state and a device charging state for the Universal Serial Bus (USB) connected mobile electronic device is shown. In order to determine if the mobile electronic device has entered the device charging state, a check is performed to sense if inputs to the charger interface 14 are in a low state.

When the inputs are in a low state, the indication is that there is no power being transferred to the CPU 12 and therefore no power for operating the device 10. As will be understood, the device may be turned off, the rechargeable battery 16 is dead or not present or the user may have placed the device in the device suspend mode. Therefore, after sensing that the inputs to the charger interface have been set at a low state, the status and level of a bus voltage (supplied by the power source 30 in the USB host) is sensed (step 34). The bus voltage is provided when the USB cable is connected between the USB host and the mobile electronic device. If the bus voltage is not sensed, a voltage supervisor continues to monitor for the presence of the bus voltage.

If the bus voltage is sensed, the battery charger is then enabled (step 36). After enabling the battery charger, a timer is then enabled (step 38), and set to a pre-determined time period, preferably at least 100 msec. Once the timer is set, it begins to count down. A check is then performed to verify that the timer has not expired (step 40), i.e., that the predetermined time period has not elapsed. If the timer has expired, the battery charger is then disabled (step 42) and the device returns to the step of sensing the bus voltage (step 34). If the timer has not expired, a check is performed to determine if enumeration between the CPU and the USB host has been acknowledged (step 44). In other words, a check is performed to verify whether or not the CPU has transmitted a signal requesting the battery charger to remain enabled. If enumeration has not been acknowledged, verification that the timer has not elapsed is once again performed (step 40), and the battery is disabled (step 42) where the timer has elapsed.

However, if enumeration has been acknowledged within the predetermined time period from the sending of the status and level of the bus voltage, the CPU sets the device into the device charging state (step 46) and both powers the CPU and charges the battery using the bus voltage provided by the power source.

Figure 3:
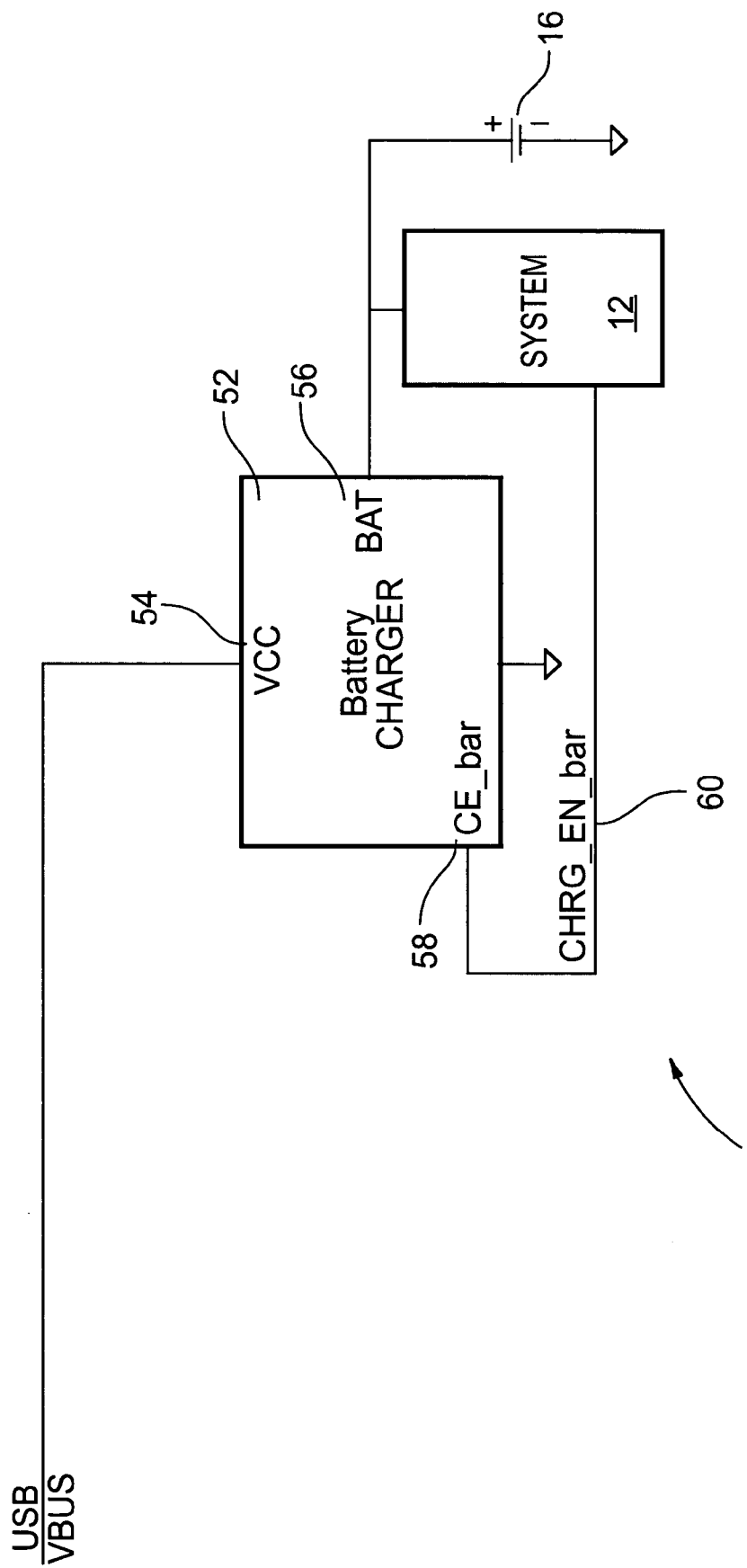
FIG. 3 is a block diagram of prior art apparatus for handling a charging state in a mobile electronic device.

Turning to FIG. 3, prior art apparatus for handling a device charging or device suspend state is shown. The apparatus 50 comprises a battery charger 52 connected via its Vcc gate 54 to the VBUS power line from the USB host 22. A BAT gate 56 is connected to the CPU 12 along with the rechargeable battery 16. The CPU 12 is also connected to a CE_bar gate 58 of the battery charger 52.

When the battery is dead or not present, the mobile electronic device 10 is connected to the USB host 22 (FIG. 1), via the USB cable, to supply the VBUS voltage via the power line. It will be understood that the rechargeable battery is preferably decoupled from the mobile electronic device 10 in order to start the CPU 12 and that recoupling may occur at any time without affecting the operation of the device as long as power is provided by the VBUS power line.

A system control signal 60 (seen as CHRG_EN_bar) from the CPU 12 is transmitted to the battery charger 52 to enable the charger when the VBUS is applied. This signal is typically a low state signal. The prior art apparatus does not wait for an enumeration acknowledgement and automatically enters the device charging state. In general, this goes against USB specifications. Therefore, when the rechargeable battery 16 is dead or not present and the CPU 12 has no power, the CHRG_EN_bar signal 60 is low and since the charger requires an active low state signal to enable the charging function, the battery charger 52 enables and provides power (in the form of current received from the VBUS power line) to the CPU 12. When the USB host transmits a device suspend state request, the prior art circuit is unable to handle this request is the battery is dead or not present.

Figure 4:
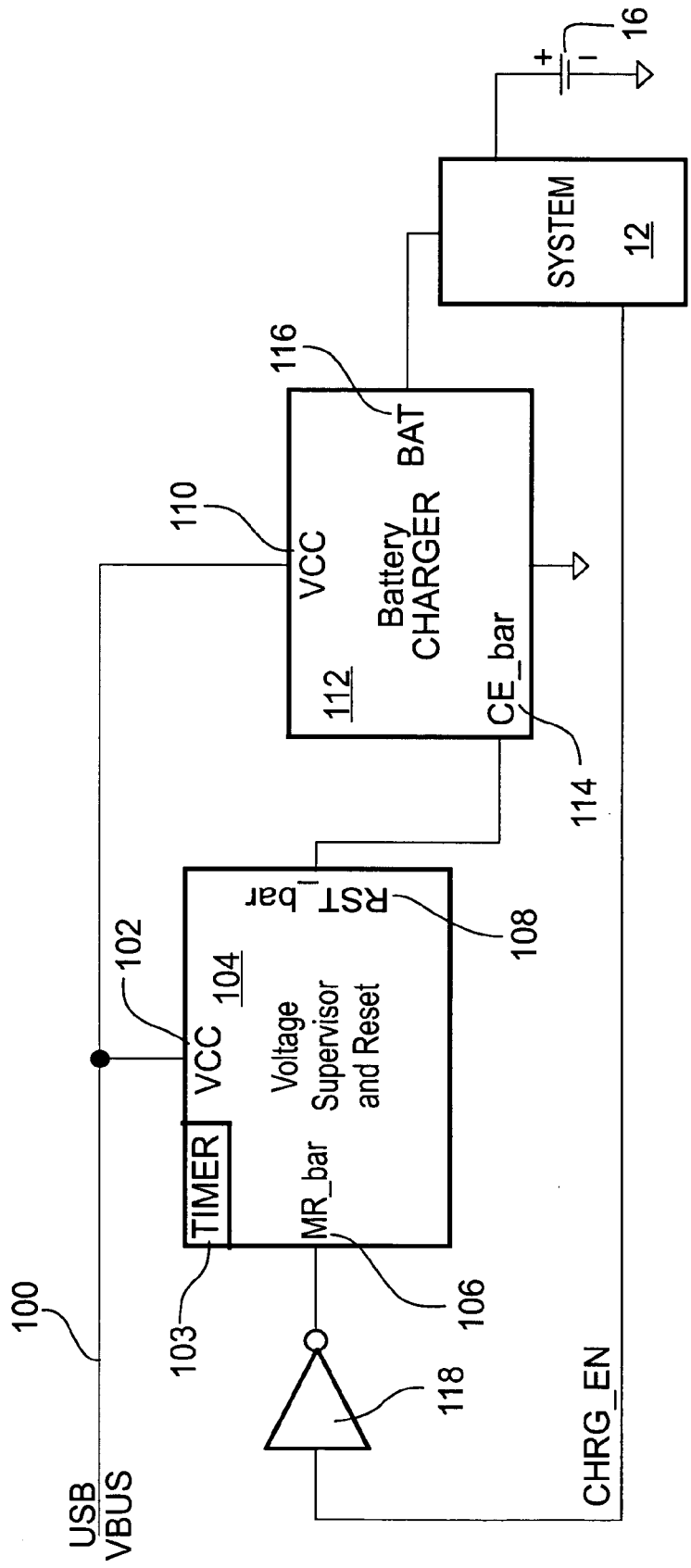
FIG. 4 is a block diagram of apparatus for handling a device charging state for a mobile electronic device.

Turning to FIG. 4, a block diagram of an embodiment of the charger interface in FIG. 1 is shown. The charger interface 14 comprises an input 100 from the VBUS power line which is connected to a Vcc gate 102 of a Voltage Supervisor and Reset module 104. In the preferred embodiment, the voltage supervisor and reset module 104 is a TPS3103 chip manufactured by Texas Instruments. The voltage supervisor and reset module 104 also comprises a MR_bar gate 106 and a RST_bar gate 108. The VBUS input 100 is also connected to a Vcc gate 110 of a battery charger 112. The RST_bar gate 108 is connected to a CE_bar gate 114 of the battery charger 112 while a BAT gate 116 of the battery charger 112 is connected to the rechargeable battery 16 via the CPU 12. The CPU 12 is also connected to the MR_bar gate 106 of the voltage supervisor and reset module 104 via a NOT gate (or inverter) 118. It will be understood that the signals being received at the MR_bar gate 106, the RST_bar gate 108, the CE_bar gate 114 and the NOT gate 118 are binary inputs so that the signal is either a low state (0) or a high state (1) signal.

In operation, when the rechargeable battery is dead or not present, in order to provide power for operation of the mobile electronic device 10 (FIG. 1), the USB cable 24 is connected to the USB port 20 of the mobile electronic device 10. Once connected, the voltage supervisor and reset module 104 checks the status and level of the input 100 from the VBUS power line. The check is performed by the Vcc gate 102 of the voltage supervisor and reset module 104. After sensing the presence of the input 100, a timer 103 within the voltage supervisor and reset module 104 is started to determine when a predetermined time period, as described above, has elapsed. The timer 103 may be implemented in a number of ways, digitally or by analog means (with an RC circuit, for example). This predetermined time period is used to determine whether the mobile electronic device 10 has received an enumeration acknowledgement from the USB host 22 to draw power from the USB host via the VBUS input power line. A continuous check is performed by the voltage supervisor and reset module 104 to determine if the timer has expired.

During this predetermined time period, the CPU 12 is powered from the power source 30 in the USB host 22. This allows the charging process to begin before the enumeration is completed. Within the predetermined time period, the CPU 12 is required to enumerate with the USB host 22 to continue drawing current to power the device 10 and charge the battery.

After sensing the presence of the input 100, the voltage supervisor and reset module 104 transmits a low state (0) signal from its RST_bar gate 108 to the CE_bar gate 114 of the battery charger 112 to enable the battery charger 112. The battery charger 112 then transmits a voltage (current) to the CPU 12 and the rechargeable battery 16 using the current received in its Vcc gate 110 from the input 100. Once the CPU 12 receives the current, the CPU 12 requests enumeration from the USB CPU 32 in the USB host 22. Once it receives an enumeration acknowledgement, the CPU 12 transmits a high state CHRG_EN signal to the inverter 118 which inverts the signal to a low state signal before transmitting it to the MR_bar gate 106. If the low state signal is not received by the MR_bar gate 106 prior to the end of the predetermined time period, the voltage supervisor and reset module 104 transmits a high signal from its RST_bar gate 108 to the CE_bar gate 114 to disable the battery charger 112. In order to verify whether the timer is expired, resulting in the disabling of the battery charger, the initial low state signal transmitted from the voltage supervisor and reset module 104 to the battery charger, is set for the predetermined time period and once the time period expires, the low state signal is switched to a high state signal which disables the battery charger.

However, if the enumeration is acknowledged before the expiration of the timer, the voltage supervisor and reset module 104 transmits a low state signal to the CE_bar gate 114 and the battery charger 112 remains enabled so as to receive the input 100 and supply the necessary current for powering the mobile electronic device 10 and for charging the battery 16.

The enablement of the battery charger 112 continues until the USB cable is disconnected from the USB port 20 or if a device suspend signal is transmitted along the data lines of the USB cable 24 from the USB CPU 32 to the CPU 12 of the mobile electronic device 10, indicating that the USB host 22 requests that the mobile electronic device 10 enter the device suspend state. After receiving the request, in order to comply with USB specifications, the CPU 12 transmits a low state CHRG_EN signal to the inverter 118 which inverts the low state signal to a high state signal. The high state signal is then transmitted to the MR_bar gate 106 which causes the RST_bar gate 108 to transmit a high signal to the CE_bar gate 114 of the battery charger thus disabling the battery charger as requested by the USB host 22.

When the high state signal is received by the MR_bar gate 106, the signal is not immediately propagated. The timer 103 counts down for a second predetermined time period, such as 150 msec, so that if a subsequent low state signal is received by the MR_bar gate within the second time period, the high state signal is ignored. This allows the CPU 12 to reset without losing power to the battery charger 112. In general, when the CPU resets, all signals go to a low state. In this manner, a reset event does not cause the charger to be disabled since a reset event is not a device suspend state event.

An advantage of the present invention is that if the CPU 12 fails to receive enumeration acknowledgement to enable the battery charger 112 prior to the predetermined time period timer elapsing, the battery charger is automatically disabled. Therefore, the mobile electronic device 10 does not continue to draw power from the power source 30 in the USB host 22. This provides an added function so that the CPU 12 of the mobile electronic device does not inadvertently draw current without proper enumeration.

Another advantage of the present invention is that when the CPU 12 in the mobile electronic device 10 is instructed by the CPU 32 in the USB host 22 to enter the device suspend state, the CPU 12 disables the battery charger 112 by transmitting the low state signal to the inverter 118 and which is subsequently transmitted as a high state signal to the MR_bar gate of the voltage supervisor and reset. If the timer 103 has expired, and there is no change of the input from the VBUS power line, the battery charger is disabled even though VBUS is still present as required by USB specifications. When the battery charger is disabled, and the rechargeable battery 16 is not fully recharged, there is no power transmitted to the CPU 12 and although all of the state signals are active in the low state, the signals do not cause the battery charger to become enabled as was the situation with the initial USB cable connection.

Furthermore, another advantage of the present invention is that only one signal is required to switch the mobile electronic device from the device charging state to the device suspend state.

The above-described embodiments of the present invention are intended to be examples only. Alterations, modifications and variations may be effected to the particular embodiments by those of skill in the art without departing from the scope of the invention, which is defined solely by the claims appended hereto.

It is claimed:

1. A method for charging a mobile electronic device from a Universal Serial Bus (USB) host upon coupling the mobile electronic device to the USB host, comprising:
   detecting that the mobile electronic device is in a device suspend state upon coupling of a USB interface of the device to the USB host;
   sensing an input voltage from the USB host;
   entering a device charging state in response to sensing the input voltage;
   powering a processing device in the mobile electronic device from the input voltage while the mobile electronic device is in the device charging state;
   enabling the processing device to receive and process control signals from the USB host;
   requesting enumeration from the USB host; and
   if an enumeration acknowledgement is not received from the USB host within a predetermined time period, then entering the device suspend state.

2. The method of claim 1, wherein the predetermined time period is at least 100 ms.

3. The method of claim 1, further comprising:
   transmitting a time dependent enable signal to a battery charger circuitry in response to sensing the input voltage, the time dependent enable signal causing the mobile electronic device to enter the device charging state.

4. The method of claim 3, further comprising:
   receiving a device suspend state control signal from the USB host; and
   in response to the device suspend state control signal, disabling the battery charger circuitry to enter the device suspend state.

5. A mobile electronic device, comprising:
   a rechargeable power source;
   a processing device configured to control the operation of the mobile electronic device;
   a Universal Serial Bus (USB) interface for coupling the rechargeable power source and the processing device to a USB host;
   the processing device being coupled to the rechargeable power source and the USB interface, wherein the processing device receive power from the rechargeable power source and from the USB host via the USB interface;
   the USB interface being configured to detect that the mobile electronic device is in a device suspend state upon coupling of the USB interface to the USB host, and in response to detecting that the mobile electronic device is in the device suspend state when coupled to the USB host, power the processing device from the USB host for a predetermined time period while an enumeration request is transmitted to the USB host; and
   the USB interface being further configured to disable power to the processing device from the USB host if an enumeration acknowledgement is not received from the USB host within the predetermined time period.

6. The mobile electronic device of claim 5, wherein the USB interface comprises:
   a battery charger circuitry that receives a power input from the USB host and generates a power output to the rechargeable power source and the processing device; and
   a voltage supervisor and reset module configured to enable and disable the power output from the battery charger circuitry.

7. The mobile electronic device of claim 6, wherein the voltage supervisor and reset module is further configured to receive a device suspend state control signal from the USB host causing the voltage supervisor and reset module to disable the battery charger.

8. The mobile electronic device of claim 6, wherein the voltage supervisor and reset module is configured to detect the power input from the USB host.

9. The mobile electronic device of claim 8, wherein the voltage supervisor and reset module is configured to activate a timer in response to detecting the power input from the USB host, wherein the timer is configured to determine when the predetermined time period has elapsed.

10. The mobile electronic device of claim 9, wherein the voltage supervisor and reset module is configured to disable the battery charger is the timer expires before the voltage supervisor and reset module receives a signal from the processing device indicating that an enumeration acknowledgement has been received from the USB host.

11. The mobile electronic device of claim 5, wherein the predetermined time period is at least 100 ms.

* * * * *